(12) United States Patent
Okamura et al.

(10) Patent No.: US 11,999,827 B2
(45) Date of Patent: Jun. 4, 2024

(54) POLYCARBOSILAZANE, AND COMPOSITION COMPRISING THE SAME, AND METHOD FOR PRODUCING SILICON-CONTAINING FILM USING THE SAME

(71) Applicant: Merck Patent GmbH, Darmstadt (DE)

(72) Inventors: Toshiya Okamura, Kakegawa (JP); Tetsuo Okayasu, Kakegawa (JP); Thorsten Vom Stein, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 17/922,800

(22) PCT Filed: May 4, 2021

(86) PCT No.: PCT/EP2021/061668
§ 371 (c)(1),
(2) Date: Nov. 2, 2022

(87) PCT Pub. No.: WO2021/224224
PCT Pub. Date: Nov. 11, 2021

(65) Prior Publication Data
US 2023/0174724 A1   Jun. 8, 2023

(30) Foreign Application Priority Data

May 7, 2020   (EP) .................... 20173584

(51) Int. Cl.
*C08G 77/60* (2006.01)
*C08G 77/62* (2006.01)
*C09D 183/16* (2006.01)

(52) U.S. Cl.
CPC ............ *C08G 77/60* (2013.01); *C08G 77/62* (2013.01); *C09D 183/16* (2013.01)

(58) Field of Classification Search
CPC ................................ C08G 77/60; C08G 77/62
See application file for complete search history.

(56) References Cited

U.S. PATENT DOCUMENTS

| | | | |
|---|---|---|---|
| 4,617,078 A | 10/1986 | Takahashi et al. | |
| 4,720,532 A | 1/1988 | Seyferth et al. | |
| 4,847,345 A | 7/1989 | Takamizawa et al. | |
| 4,869,854 A | 9/1989 | Takeda et al. | |
| 5,011,801 A | 4/1991 | Vaahs et al. | |
| 5,032,663 A | 7/1991 | Vaahs et al. | |
| 5,182,411 A * | 1/1993 | Vaahs ................... | C08G 77/62 528/33 |
| 2007/0197047 A1 | 8/2007 | Imada et al. | |
| 2016/0379817 A1 | 12/2016 | Okamura et al. | |
| 2019/0040279 A1 | 2/2019 | Khandelwal et al. | |

FOREIGN PATENT DOCUMENTS

| | | |
|---|---|---|
| CA | 2004395 A1 | 6/1990 |
| EP | 368535 * | 10/1989 |
| JP | 45-001070 B | 1/1970 |
| JP | 60-141758 A | 7/1985 |
| JP | 60-163968 A | 8/1985 |
| JP | 63-117037 A | 5/1988 |
| JP | 63-193930 A | 8/1988 |
| JP | 63-210133 A | 8/1988 |
| JP | 02-500982 A | 4/1990 |
| JP | 02-194026 A | 7/1990 |
| JP | 02-199126 A | 8/1990 |
| JP | 05-086200 A | 4/1993 |
| JP | 06-060734 A | 3/1994 |
| JP | H06256067 A * | 9/1994 |
| JP | 2007-224114 A | 9/2007 |
| JP | 2014-201734 A | 10/2014 |
| JP | 2019-513174 A | 5/2019 |
| KR | 10-2016-0096671 A | 8/2016 |

OTHER PUBLICATIONS

Machine translation of JP 05-97411 into English (no date).*
International Search Report and Written Opinion received for PCT Patent Application No. PCT/EP2021/061668, dated Aug. 27, 2021, 9 pages.
International Preliminary Report on Patentability received for PCT Patent Application No. PCT/EP2021/061668, dated Nov. 17, 2022, 7 pages.

* cited by examiner

*Primary Examiner* — Marc S Zimmer
(74) *Attorney, Agent, or Firm* — Faegre Drinker Biddle & Reath LLP

(57) ABSTRACT

[Problem] To provide a polycarbosilazane making it possible to form a silicon-containing film which is bearable to acid etching, and a composition comprising the polycarbosilazane. [Means for Solution] The present invention provides a polycarbosilazane comprising a repeating unit of —[$R^1R^2Si$—$(CH_2)_n$]— and —($R^3R^4Si$—$NR^5$)—, wherein $R^1$, $R^2$, $R^3$ and $R^4$ are each independently a single bond, hydrogen or $C_{1-4}$ alkyl; $R^5$ is independently a single bond or hydrogen; and n is 1-2, and a composition comprising the polycarbosilazane. The present invention also provides a method for forming a silicon-containing film, comprising coating the composition above a substrate and heating.

14 Claims, No Drawings

POLYCARBOSILAZANE, AND COMPOSITION COMPRISING THE SAME, AND METHOD FOR PRODUCING SILICON-CONTAINING FILM USING THE SAME

CROSS-REFERENCE TO RELATED APPLICATIONS

This application is a National stage application (under 35 U.S.C. § 371) of PCT/EP2021/061668, filed May 4, 2021, which claims benefit of European Application No. 20173584.2, filed May 7, 2020, both of which are incorporated herein by reference in their entirety.

BACKGROUND OF THE INVENTION

Technical Field

The present invention relates to a polycarbosilazane making it possible to form a silicon-containing film which is bearable to acid etching in a manufacturing process of semiconductor devices and the like, and a composition comprising the polycarbosilazane. Further, the present invention also relates to a method for forming a silicon-containing film using the same.

Background Art

In manufacture of electronic devices, especially semiconductor devices, an interlayer insulating film may be formed between a transistor element and a bit line, between a bit line and a capacitor, between a capacitor and a metal wiring, between plural of metal wirings, and the like. Further, an insulating material may be filled in isolation trenches provided on a substrate surface or the like. Furthermore, after forming a semiconductor element on a substrate surface, a coating layer may be formed using a sealing material to provide a package. The interlayer insulating film and the coating layer are often formed from a silicon-containing material.

A chemical vapor deposition method (CVD method), a sol-gel method, a method for applying a composition comprising a silicon-containing polymer and baking, and the like are used for a method for forming a silicon-containing film such as a siliceous film, a silicon nitride film, a silicon carbide film or a silicon carbonitride film. Among these, the method for forming a silicon-containing film using a composition is often employed since it is relatively simple. To form a silicon-containing film, a composition comprising a silicon-containing polymer such as polysilazane, polysiloxane, polysiloxazane, polycarbosilane or polysilane is applied above a surface of a substrate or the like and baked to cure the polymer to form a silicon-containing film.

It has been required for a material which can fill a narrow and a high aspect ratio trench of a semiconductor device and can be converted into a silicon-containing film by curing, which is bearable to acid etching. Furthermore, small residual stress after a curing process is eagerly required.

U.S. Pat. No. 5,011,801 discloses a process for the preparation of a polymeric ethylenebridged chlorosilazane by reaction of a 1,2-bis(organyldichlorosilyl)ethane with ammonia. The polymeric ethylenebridged chlorosilazane is converted into polysilazane by reaction with ammonia. The polysilazane can be converted by pyrolysis in an inert atmosphere into silicon nitride containing ceramic material.

JP 2014201734 A discloses a composition used for manufacturing a glassy film, with which a flexible glassy film can be manufactured with curing at low temperature. The composition used for manufacturing a glassy film containing a polymer including a repeating unit of $-[(NR^3)_n-Si(R^1{}_{3-n})-(CR^4{}_2)_p-Si(R^2{}_{3-m})(-)-]_m$, in which $R^1$ to $R^4$ are each independently a hydrogen atom, an alkyl group having 1 to 6 carbon atoms which may contain a substituent, or a phenyl group which may contain a substituent, however $R^1$ and $R^2$ are not hydrogen atoms at the same time, p is an integer of 1 to 6, and n and m are each independently an integer of 1 to 3.

US 2019/0040279 A1 discloses a Si-containing film forming composition to produce films with desirable electrical and physical properties. The composition comprises a precursor having the formula $[-NR-R^4R^5Si-(CH_2)_t-SiR^2R^3]_n$, wherein t=1 to 4; n=2 to 400; R, $R^2$, $R^3$, $R^4$, and $R^5$ are independently H, a hydrocarbon group, or an alkylamino group, and provided that at least one of $R^2$, $R^3$, $R^4$, and $R^5$ is H; and R is independently H, a hydrocarbon group, or a silyl group.

U.S. Pat. No. 4,869,854 discloses a process for the preparation of an organic silazane by ammonolysis of a mixture of 1,2-bis(trichlorosilyl)ethane, methyldichlorosilane and methyltrichlorosilane. The ammonolysis product is polymerized with basic catalyst. The organic silazane polymer is sintered to obtain ceramic material composed of silicon carbide-silicon nitride.

PRIOR ART DOCUMENTS

Patent Document 1: U.S. Pat. No. 5,011,801
Patent Document 2: JP 2014201734 A
Patent Document 3: US 2019/0040279 A1
Patent Document 4: U.S. Pat. No. 4,869,854

SUMMARY OF THE INVENTION

One embodiment of the present invention provides a polycarbosilazane that is able to form a silicon-containing film which is bearable to acid etching in a manufacturing process of semiconductor devices and the like Another embodiment of the present invention provides a composition comprising the polycarbosilazane and a solvent that can fill a narrow and a high aspect ratio trench and can produce a thick silicon-containing film.

Still another embodiment of the present invention provides a method of manufacturing a silicon-containing film having excellent electrical properties.

Yet another embodiment of the present invention provides a method of manufacturing an electronic device having a silicon-containing film with excellent electrical properties.

One embodiment of the present invention provides a polycarbosilazane comprising a repeating unit represented by the following formula (1) and a repeating unit represented by the following formula (2):

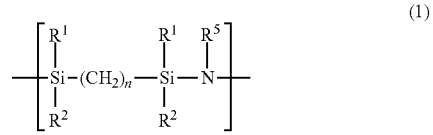

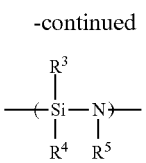
(2)

wherein $R^1$, $R^2$, $R^3$ and $R^4$ are each independently a single bond, hydrogen, or $C_{1-4}$ alkyl; $R^5$ is independently a single bond or hydrogen; and n is 1-2.

The polycarbosilazane has a ratio of an integrated intensity between 1.7 and 2.2 ppm (hereinafter refers to as "Intensity $CH_2$") with respect to sum of an integrated intensity between 1.7 and 2.2 ppm and an integrated intensity between 1.0 to 1.6 ppm (hereinafter refers to as "Intensity NH") in $^1$H-NMR spectrum is 0.05 to 0.5. It is believed that the signals between 1.7 and 2.2 ppm in $^1$H-NMR spectrum are attributed to $CH_2$ and signals between 1.0 and 1.6 ppm in $^1$H-NMR spectrum are attributed to NH.

The polycarbosilazane is free of Si—Si bonds.

The polycarbosilazane has a mass average molecular weight of 1,500 to 25,000 measured by gel permeation chromatography in terms of polystyrene.

Another embodiment of the present invention provides a composition comprising the above-described polycarbosilazane and a solvent.

Still another embodiment of the present invention provides a method of producing a silicon-containing film that includes applying the above-described composition above a substrate to form a coating; curing the coating under a water vapor atmosphere or a non-oxidizing atmosphere.

Yet another embodiment of the present invention provides a method of manufacturing an electronic device having a silicon-containing film manufactured by a method comprising; applying the above-described composition above a substrate to form a coating; curing the coating under an oxidizing atmosphere or a non-oxidizing atmosphere.

The polycarbosilazane of the present invention is able to obtain a silicon-containing film which is bearable to acid etching in a manufacturing process of semiconductor devices and the like. The composition comprising the polycarbosilazane is able to fill a narrow and a high aspect ratio trench. Further, the resultant silicon-containing film has features that its residual stress after curing is small and that its electrical properties is excellent. It is possible to improve the yield of electronic devices by using the composition comprising the polycarbosilazane.

DEFINITIONS

Unless otherwise stated, the following terms used in the specification and claims shall have the following meanings for the purpose of the present specification.

In the present specification, the use of the singular includes the plural, and the words "a", "an" and "the" mean "at least one", unless specifically stated otherwise. Furthermore, the use of the term "including", as well as other forms such as "includes" and "included", is not limiting. Also, terms such as "element" or "component" encompass both elements or components comprising one unit and elements or components that comprise more than one unit, unless specifically stated otherwise. As used herein, the conjunction "and" is intended to be inclusive and the conjunction "or" is not intended to be exclusive, unless otherwise indicated. For example, the phrase "or, alternatively" is intended to be exclusive. As used herein, the term "and/or" refers to any combination of the foregoing elements including using a single element.

The term "about" or "approximately," when used in connection with a measurable numerical variable, refers to the indicated value of the variable and to all values of the variable that are within the experimental error of the indicated value (e.g., within the 95% confidence limit for the mean) or within ±10 percent of the indicated value, whichever is greater.

In the present specification, the descriptions such as "$C_{x-y}$", "$C_x$-$C_y$" and "$C_x$" mean the number of carbon atoms in a molecule or substituent. For example, $C_{1-6}$ alkyl means alkyl having not less than 1 and not more than 6 carbons (methyl, ethyl, propyl, butyl, pentyl, hexyl etc.).

In the present specification, unless otherwise specifically mentioned, "alkyl" means a linear or branched alkyl, and "cycloalkyl" means alkyl containing a cyclic structure. Those in which a cyclic structure is substituted with a linear or branched alkyl are also referred to as cycloalkyl. Further, those having a polycyclic structure such as bicycloalkyl are also included in cycloalkyl. "Heteroalkyl" means alkyl containing oxygen or nitrogen in the main chain or side chain unless otherwise specifically mentioned and means, for example, alkyl including oxy, hydroxy, amino, carbonyl and the like. Further, "hydrocarbyl group" means a monovalent, divalent, or higher group comprising carbon and hydrogen and optionally containing oxygen or nitrogen. Furthermore, in the present specification, unless otherwise specifically mentioned, "alkylene" means a divalent group corresponding to said alkyl and includes, for example, a linear alkylene or a branched alkylene having a side chain.

In the case of numerical range is described with "to", "-" or "~", these include end points and units are common. For example, 5-25 mol % refers to that 5 mol % or more and 25 mol % or less.

In the present specification, "integrated intensity" between −25 and −5 ppm means the integrated value of the spectrum of a proton nuclear magnetic resonance ($^1$H-NMR) in the range of between −25 ppm and −5 ppm, that is, the area of the region surrounded by the curve and the baseline where the intensity becomes 0.

In the present specification, in the case polymer comprises plural kinds of repeating units without any specific definitions, these repeating units copolymerize.

These copolymerizations can take alternating copolymerization, random copolymerization, block copolymerization, graft copolymerization, or any mixture of thereof.

In the present specification, unless otherwise specifically mentioned, Celsius is used as the temperature unit. For example, 20 degrees means 20 degrees Celsius.

In the present specification, unless otherwise specifically mentioned, "%" means "% by mass" and "parts" means "parts by mass".

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literatures and similar materials defines a term in a manner that contradicts the definition of that term in this application, this application controls.

DETAILED DESCRIPTION OF THE INVENTION

Embodiments of the present invention are described below in detail.

[Polycarbosilazane]

The polycarbosilazane of the present invention comprises a repeating unit represented by the following formula (1) and a repeating unit represented by the following formula (2):

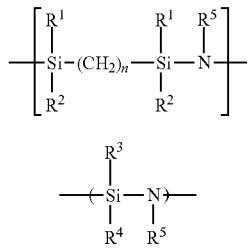

(1)

(2)

wherein $R^1$, $R^2$, $R^3$ and $R^4$ are each independently a single bond, hydrogen or $C_{1-4}$ alkyl;

$R^5$ is independently a single bond or hydrogen;

and n is 1-2.

The polycarbosilazane has a ratio of (Intensity $CH_2$)/[(Intensity $CH_2$)+(Intensity NH)] in $^1$H-NMR spectrum is 0.05 to 0.5. The measurement of $^1$H-NMR can be specifically carried out on a sample solution which is prepared by dissolving 0.4 g of the polycarbosilazane in 1.6 g of a deuterated solvent such as deuterochloroform. Tetramethylsilane (TMS) is added to the solution as internal standard for calibrating chemical shift. The sample solution is measured 80 times using a nuclear magnetic resonance apparatus, JNM-ECS400 type (JEOL Ltd.) to obtain a $^1$H-NMR spectrum. In the present invention, for example, "Intensity $CH_2$" means the integrated intensity in the range of between 1.7 and 2.2 ppm and "Intensity NH" means the integrated intensity in the range of between 1.0 and 1.6 ppm.

The polycarbosilazane is free of Si—Si bonds. An existence of Si—Si bonds in the polycarbosilazane is evaluated by $^{29}$Si-NMR measurement. The measurement of $^{29}$Si-NMR can be specifically carried out on a sample solution which is prepared by dissolving 0.4 g of the polycarbosilazane in 1.6 g of a deuterated solvent such as deuterochloroform. Tetramethylsilane (TMS) is added to the solution as internal standard for calibrating chemical shift. The sample solution is measured 1,000 times using a nuclear magnetic resonance apparatus, JNM-ECS400 type (JEOL Ltd.) to obtain a $^{29}$Si-NMR spectrum. In the obtained $^{29}$Si-NMR spectrum, peaks assigned to Si—Si bond between −20 and −10 ppm is checked for its existence.

The polycarbosilazane of the present invention is obtainable by co-ammonolysis of at least one compound selected from the group consisting of silicon compounds represented by the following formula (3), and at least one compound selected from the group consisting of silicon compounds represented by the following formula (4):

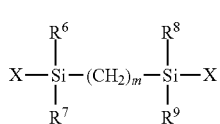

(3)

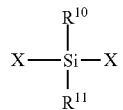

(4)

wherein $R^6$, $R^7$, $R^8$, $R^9$ and $R^{10}$ are each independently hydrogen, chlorine, bromine or $C_{1-4}$ alkyl;

$R^{11}$ is hydrogen or $C_{1-4}$ alkyl;

X is chlorine or bromine;

and m is 1-2.

The molar ratio of the silicon compound represented by the formula (3) to the silicon compound represented by the formula (4) is preferably 0.02 to 0.5, more preferably 0.03 to 0.33. When the molar ratio is less than 0.02, the resultant silicon-containing film is not bearable to acid etching in a manufacturing process of semiconductor devices and the like. On the other hand, when the molar ratio is more than 0.5, the polycarbosilazane will be fusible on heating and be difficult to handle in a manufacturing process of semiconductor devices and the like.

Examples of the silicon compound represented by the formula (3) include bis(trichlorosilyl)methane, bis(dichlorosilyl)methane, bis(chlorosilyl)methane, bis(chlorodimethylsilyl)methane, bis(chloroethylmethylsilyl)methane, bis(chlorodiethylsilyl)methane, bis(chlorodiisopropylsilyl)methane, bis(chlorodibutylsilyl)methane, bis(dichloromethylsilyl)methane, bis(dichloroethylsilyl)methane, bis(dichloroisopropylsilyl)methane, bis(butyldichlorosilyl)methane, trichloro[(dichlorosilyl)methyl]silane, chlorosilyl(dichlorosilyl)methane, dichloromethyl[(trichlorosilyl)methyl]silane, chlorodimethyl[(trichlorosilyl)methyl]silane, dichloro[(dichlorosilyl)methyl]methylsilane, chloro[(dichlorosilyl)methyl]dimethylsilane, chloro[(dichlorosilyl)methyl]methylsilane, chloro[(dichloromethylsilyl)methyl]dimethylsilane, dichloroethyl[(trichlorosilyl)methyl]silane, chlorodiethyl[(trichlorosilyl)methyl]silane, dichloro[(dichlorosilyl)methyl]ethylsilane, chloro[(dichlorosilyl)methyl]diethylsilane, chloro[(dichlorosilyl)methyl]ethylsilane, 1,2-bis(trichlorosilyl)ethane, 1,2-bis(dichlorosilyl)ethane, 1,2-bis(chlorosilyl)ethane, 1,2-bis(dichloromethylsilyl)ethane, 1,2-bis(dichloroethylsilyl)ethane, 1,2-bis(dichloropropylsilyl)ethane, 1,2-bis(dichlorobutylsilyl)ethane, 1,2-bis(chlorodimethylsilyl)ethane, 1,2-bis(chloroethylmethylsilyl)ethane, 1,2-bis(chlorodiethylsilyl)ethane, 1,2-bis(chlorodipropylsilyl)ethane, 1,2-bis(chlorodibutylsilyl)ethane, trichloro[2-(dichlorosilyl)ethyl]silane, trichloro[2-(chloromethylsilyl)ethyl]silane, dichloromethyl[2-(trichlorosilyl)ethyl]silane, trichloro[2-(chloromethylsilyl)ethyl]silane, chlorodimethyl[2-(trichlorosilyl)ethyl]silane, dichloro[2-(chloromethylsilyl)ethyl]methylsilane, dichloroethyl[2-(trichlorosilyl)ethyl]silane, dichloro[2-(dichlorosilyl)ethyl]ethylsilane, chloro[2-(dichloroethylsilyl)ethyl]diethylsilane, dichloro[2-(dichloroethylsilyl)ethyl]methylsilane, and chloro[2-(chlorodimethylsilyl)ethyl]ethylmethylsilane. They can be used singly or in combination of two or more.

Examples of the silicon compound represented by the formula (4) include trichlorosilane, dichlorosilane, methyldichlorosilane, dimethyldichlorosilane, ethyldichlorosilane, diethyldichlorosilane, ethylmethyldichlorosilane, propyldichlorosilane, dipropyldichlorosilane, methylpropyldichlorosilane, butyldichlorosilane, butylmethyldichlorosilane, dibutyldichlorosilane, di-tert-butyldichlorosilane, and tert-butylmethyldichlorosilane. They can be used singly or in combination of two or more.

The co-ammonolysis of the silicon compound represented by the formula (3), and the silicon compound represented by the formula (4) is carried out in a solvent. The silicon compound represented by the formula (3) is dissolved in a solvent and subsequently the silicon compound represented by the formula (4) is added to the mixture. Ammonia is introduced into the mixture. The molar amount of the introduced ammonia is preferably three times to six times of the sum of molar of the silicon compound represented by the formula (3) and molar of the silicon compound represented by the formula (4). The co-ammonolysis is conducted at a temperature between −10 to 20° C. for 1 to 24 hours. After the reaction, by-product of the reaction mixture is removed by filtration to obtain a polycarbosilazane in a solvent.

A wide variety of solvents can be used for the co-ammonolysis. Suitable solvents include, but are not limited to, aromatic compounds such as benzene, toluene, xylene, ethylbenzene, diethylbenzene, trimethylbenzene and triethylbenzene; saturated hydrocarbon compounds such as cyclohexane, decahydronaphthalene, dipentene, n-pentane, i-pentane, n-hexane, i-hexane, n-heptane, i-heptane, n-octane, i-octane, n-nonane, i-nonane, n-decane, ethylcyclohexane, methylcyclohexane, cyclohexane and p-menthane; unsaturated hydrocarbon compounds such as cyclohexene; halogenated hydrocarbon compounds such as methylene chloride, chloroform, carbon tetrachloride, bromoform, ethylene chloride, ethylidene chloride, trichloroethane and tetrachloroethane; heterocyclic compounds such as, pyrrolidine, pyrrole, imidazolidine, piperidine, pyridine, methylpyridine, dimethylpyridine, pyridazine, azepane and quinoline; ether compounds such as dipropyl ether, dibutyl ether and anisole; ester compounds such as n-butyl acetate, i-butyl acetate, n-amyl acetate and i-amyl acetate; ketone compounds such as methyl isobutyl ketone (MIBK); tertiary amine compounds such as trimethylamine, dimethylethylamine, diethyl methyl amine and triethylamine. Solvent can be used singly or in combination of two or more.

It is preferable that the polycarbosilazane has the ratio of N1/(N1+N2) of 0.02-0.33, preferably 0.03-0.25, in which N1 is the number of repeating unit represented by the formula (1) and N2 is the number of repeating unit represented by the formula (2).

The polycarbosilazane of the present invention has a specific molecular weight. When heating a composition comprising the polycarbosilazane of the present invention to convert to a silicon-containing film, the mass average molecular weight of the polycarbosilazane is preferably large in order to reduce evaporation of low-molecular components, and to prevent a volume shrinkage in fine trenches. On the other hand, it is necessary for the composition to have a fine coatability and a viscosity, which can fill a narrow and a high aspect ratio trench. The mass average molecular weight of the polycarbosilazane of the present invention is preferably 1,500-25,000, more preferably 2,000-20,000. A mass average molecular weight in terms of polystyrene can be measured by a gel permeation chromatography (GPC) based on polystyrene standard.

Examples of $R^1$, $R^2$, $R^3$ and $R^4$ in the formula (1) and the formula (2) include, but not limited to, a single bond, hydrogen, methyl, ethyl, n-propyl, isopropyl, n-butyl, isobutyl. The polycarbosilazane of the present invention is preferably a polyperhydrocarbosilazane, in which $R^1$, $R^2$, $R^3$, $R^4$ and $R^5$ in the formula (1) and the formula (2) are each independently a single bond or hydrogen. The polyperhydrocarbosilazane can have a terminal group of —$SiH_3$.

An example of a polyperhydrocarbosilazane is as follows;

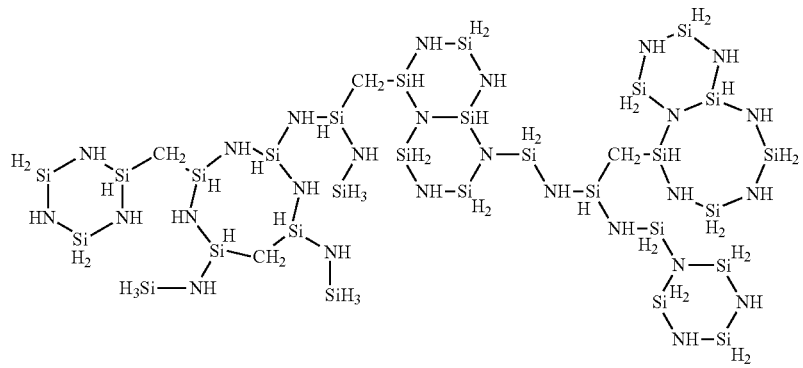

[Composition]

The composition of the present invention comprises the polycarbosilazane and a solvent. A wide variety of solvents can be used to prepare the composition. Suitable solvents include, but are not limited to, aromatic compounds such as benzene, toluene, xylene, ethylbenzene, diethylbenzene, trimethylbenzene and triethylbenzene; saturated hydrocarbon compounds such as cyclohexane, decahydronaphthalene, dipentene, n-pentane, i-pentane, n-hexane, i-hexane, n-heptane, i-heptane, n-octane, i-octane, n-nonane, i-nonane, n-decane, ethylcyclohexane, methylcyclohexane, cyclohexane and p-menthane; unsaturated hydrocarbon compounds such as cyclohexene; ether compounds such as dipropyl ether, dibutyl ether and anisole; ester compounds such as n-butyl acetate, i-butyl acetate, n-amyl acetate and i-amyl acetate; ketone compounds such as methyl isobutyl ketone (MIBK). Solvent can be used singly or in combination of two or more. By using plural kinds of solvents, it is possible to adjust the solubility of the polycarbosilazane and the evaporation rate of the solvent.

Considering the workability of the adopted coating method and the permeability of the composition into a fine trench and the film thickness required outside of the trench, the amount of the solvent in the composition can be appropriately selected according to the mass average molecular weight of the employed polycarbosilazane. The composition of the present invention generally contains from 1 to 50 mass %, preferably from 1 to 30 mass % of the polycarbosilazane based on the total mass of the composition.

The composition of the present invention can contain optional components, for example, surfactants and the like. Since the surfactant can improve coatability, it is preferable to be used. Examples of the surfactant that can be used in the composition of the present invention include nonionic surfactants, anionic surfactants, amphoteric surfactants, and the like.

Examples of the nonionic surfactant include, polyoxyethylene alkyl ethers, such as polyoxyethylene lauryl ether, polyoxyethylene oleyl ether and polyoxyethylene cetyl ether; polyoxyethylene fatty acid diester; polyoxy fatty acid monoester; polyoxyethylene polyoxypropylene block polymer; acetylene alcohol; acetylene glycol; acetylene alcohol derivatives such as polyethoxylate of acetylene alcohol; acetylene glycol derivatives such as polyethoxylate of acetylene glycol; fluorine-containing surfactants such as Fluorad (trade name, manufactured by 3M Japan Limited), Megafac (trade name, manufactured by DIC Corporation), Surufuron (trade name, manufactured by Asahi Glass Co., Ltd.); or organosiloxane surfactants, such as KP341 (trade name, manufactured by Shin-Etsu Chemical Co., Ltd.). Examples of said acetylene glycol include 3-methyl-1-butyne-3-ol, 3-methyl-1-pentyn-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol, 2,5-dimethyl-2,5-hexane-diol and the like.

Examples of the anionic surfactant include ammonium salt or organic amine salt of alkyl diphenyl ether disulfonic acid, ammonium salt or organic amine salt of alkyl diphenyl ether sulfonic acid, ammonium salt or organic amine salt of alkyl benzene sulfonic acid, ammonium salt or organic amine salt of polyoxyethylene alkyl ether sulfuric acid, ammonium salt or organic amine salt of alkyl sulfuric acid and the like.

Examples of the amphoteric surfactant include 2-alkyl-N-carboxymethyl-N-hydroxyethyl imidazolium betaine, lauric acid amide propyl hydroxysulfone betaine and the like.

These surfactants can be used alone or as a mixture of two or more kinds, and the mixing ratio thereof is usually 50 to 10,000 ppm, preferably 100 to 5,000 ppm, based on the total mass of the composition.

[Method for Producing a Silicon-Containing Film]

A method for producing a silicon-containing film of the present invention comprises applying the above-described composition above a substrate to form a coating and curing the coating under an oxidizing atmosphere or a non-oxidizing atmosphere.

The method for applying the composition to such a substrate is not limited in particular and includes usual methods for coating, for example, a spin coating, a dip coating, a spray coating, a transfer method, a roll coating, a bar coating, a doctor coating, a brush coating, a flow coating, or a slit coating, and the like. A suitable substrate on which the composition is applied is, for example, a silicon substrate, a glass substrate, and a resin film. Semiconductor elements and the like can be formed on these substrates as necessary.

After applying the composition, for the purposes of drying or preliminary curing of the coating film, a prebaking step is preferably carried out. The prebaking step is carried out in the atmosphere of an inert gas for curing under a non-oxidizing atmosphere or air for curing under an oxidizing atmosphere. The processing conditions are, for example, at from 50 to 400° C. for 10 seconds to 30 minutes on a hotplate.

The prebaked coating film is cured under an oxidizing atmosphere or under a non-oxidizing atmosphere.

The oxidizing atmosphere is an atmosphere which oxygen partial pressure is 20-101 kPa, preferably 40-101 kPa and more preferably containing water vapor partial pressure of 1.5-80 kPa, when total pressure is 101 kPa.

It is preferable to heat under an atmosphere containing water vapor. The atmosphere containing water vapor means the atmosphere, in which the water vapor partial pressure is within a range from 0.5 to 101 kPa, preferably from 1 to 90 kPa, more preferably 1.5 to 80 kPa. Heating can be carried out within a temperature range from 200 to 800° C.

There are sometimes concerns that the heating in an atmosphere containing water vapor at an elevated temperature, for example, at a temperature exceeding 600° C. affects other element such as an electronic device, which is simultaneously exposed to the heating treatment. In such a case, the curing step can be divided into three or more stages. The heating can be carried out first in an oxidizing atmosphere at low temperature, for example, 200-400° C., second in an atmosphere containing water vapor at a relatively low temperature, for example, 300-600° C., and subsequently in an atmosphere containing no water vapor at a higher temperature, for example, 400-800° C.

Other components than water vapor in the atmosphere containing water vapor (hereinafter referred to as "dilution gas") can be any gas, and specific examples thereof are air, oxygen, nitrogen, nitrous oxide, ozone, helium, argon, and the like. In terms of quality of the obtained silicon-containing film, it is preferred to use oxygen as the dilution gas.

The non-oxidizing atmosphere means an atmosphere having an oxygen concentration of 1 ppm or less and a dew point of −76° C. or lower. Preferably, a gas atmosphere of $N_2$, Ar, He, Ne, $H_2$, or a mixture of two or more of any of these is used. Heating can be carried out within a temperature range from 200 to 1000° C.

The heating rate to the target temperature and the cooling rate during the heating are not particularly limited and can be generally within a range from 1 to 100° C./min. In addition, holding time after reaching the target temperature is not also limited in particular, and it can be generally within a range from 1 minute to 10 hours.

The silicon-containing film obtained from the curing under the oxidizing atmosphere is a siliceous film. The siliceous film in the present invention means a film comprising oxygen atom and silicon atom, in which the ratio of oxygen atom to silicon atom (O/Si) is 1.20-2.50, preferably 1.40-2.50 and more preferably 1.60-2.45. The siliceous film can contain other atoms such as hydrogen, nitrogen, and carbon.

The silicon-containing film obtained from the curing under the non-oxidizing atmosphere is a silicon carbonitrogenous film. The silicon carbonitrogenous film in the present invention means a film comprising nitrogen atom, carbon atom and silicon atom, in which the ratio of nitrogen atom to silicon atom (N/Si) is 0.70-1.1, preferably 0.75-0.98 and the ratio of carbon atom to silicon atom (C/Si) is 0.02-12.5, preferably 0.03-11.5. The silicon carbonitrogenous film can contain other atoms such as hydrogen and oxygen.

Film thickness of the derived silicon-containing film is not specifically limited but preferably 0.1-1.5 μm, more preferably 0.1-1.2 μm.

Method for producing an electronic device of the present invention comprises the above described method. Preferably the device is a semiconductor device, solar cell chip, organic light emitting diode and inorganic light emitting diode. One preferable embodiment of the device of this invention is a semiconductor device.

EXAMPLES

Hereinafter, the present invention will be described with working examples. These examples are given only for illustrative purpose and not intended to limit the scope of the present invention.

Example 1

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. 23 g (0.107 mol) of bis(dichlorosilyl)methane is introduced into the vessel. Then, 32 g (0.317 mol) of dichlorosilane was added to the mixture to produce a solid adduct ($SiH_2Cl_2.2C_5H_5N$). Upon confirming that the reaction mixture becomes −3° C. or less, 36 g of ammonia is slowly blown into the reaction mixture while stirring. Subsequently, stirring is continued for 12 hours, and then dry nitrogen is blown into the liquid layer for 30 minutes to remove excess ammonia. The resulting reaction product is subjected to filtration through 5.0 μm pore size PTFE filter and subsequently 0.2 μm pore size PTFE filter to remove by-products. Pyridine is distilled off by using an evaporator to obtain a composition of the polycarbosilazane in xylene of 20 mass % concentration. The polycarbosilazane is a polyperhydrocarbosilazane from measurements of an infrared absorption spectrum (FT-IR) using FTIR6100 (JASCO Corporation), $^1$H-NMR and $^{29}$Si-NMR. Mass average molecular weight is 11450 in terms of polystyrene measured by GPC. The ratio of (Intensity $CH_2$)/[(Intensity $CH_2$)+(Intensity NH)] in $^1$H-NMR spectrum is 0.426. The polyperhydrocarbosilazane is free of Si—Si bonds from $^{29}$Si-NMR measurement.

The polyperhydrocarbosilazane composition is spin-coated on a silicon wafer by using 1HDX2 (Mikasa Co. Ltd.). The coating is prebaked at 150° C. for 1 minute on a hotplate under air atmosphere. The prebaked film is cured at 250° C. for 30 minutes under oxygen atmosphere and subsequently at 400° C. for 60 minutes under water vapor (40 kPa) containing atmosphere. The obtained film is annealed at 650° C. for 60 minutes. Electrical properties, relative wet etching rate, residual stress are measured on the cured film. Film thickness is 0.4 μm.

Example 2

The polyperhydrocarbosilazane composition of Example 1 is spin-coated on a silicon wafer by using 1HDX2 (Mikasa Co. Ltd.). The coating is prebaked at 150° C. for 1 minute on a hotplate under nitrogen atmosphere. The prebaked film is cured at 650° C. for 60 minutes under nitrogen atmosphere. Electrical properties, relative wet etching rate, residual stress are measured on the cured film. Film thickness is 0.3 μm.

Example 3

The inside of a 1 L reaction vessel, equipped with a cooling condenser, a mechanical stirrer and a temperature controller, is replaced with dry nitrogen and thereafter 350 mL of dry pyridine is put into the reaction vessel, which is then cooled down to −3° C. 6.6 g (0.031 mol) of bis(dichlorosilyl)methane is introduced into the vessel. Then, 25 g (0.248 mol) of dichlorosilane was added to the mixture to produce a solid adduct ($SiH_2Cl_2.2C_5H_5N$). Upon confirming that the reaction mixture becomes −3° C. or less, 24 g of ammonia is slowly blown into the reaction mixture while stirring. Subsequently, stirring is continued for 12 hours, and then dry nitrogen is blown into the liquid layer for 30 minutes to remove excess ammonia. The resulting reaction product is subjected to filtration through 5.0 μm pore size PTFE filter and subsequently 0.2 μm pore size PTFE filter to remove by-products. Pyridine is distilled off by using an evaporator to obtain a composition of the polycarbosilazane in xylene of 20 mass % concentration. The polycarbosilazane is a polyperhydrocarbosilazane from measurements of FT-IR, $^1$H-NMR, and $^{29}$Si-NMR. Mass average molecular weight is 4190 in terms of polystyrene measured by GPC. The ratio of (Intensity $CH_2$)/[(Intensity $CH_2$)+(Intensity NH)] in $^1$H-NMR spectrum is 0.276. The polyperhydrocarbosilazane is free of Si—Si bonds from $^{29}$Si-NMR measurement. A silicon-containing film is produced by the same process as Example 1.

Example 4

A silicon-containing film is produced from the polyperhydrocarbosilazane composition of Example 3 by the same process as Example 2.

Example 5

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. 2.1 g (0.010 mol) of bis(dichlorosilyl)methane is introduced into the vessel. Then, 32 g (0.317 mol) of dichlorosilane was added to the mixture to produce a solid adduct ($SiH_2Cl_2.2C_5H_5N$). Upon confirming that the reaction mixture becomes −3° C. or less, 28 g of ammonia is slowly blown into the reaction mixture while stirring. Subsequently, stirring is continued for 12 hours, and then dry nitrogen is blown into the liquid layer for 30 minutes to remove excess ammonia. The resulting reaction product is subjected to filtration through 5.0 μm pore size PTFE filter and subsequently 0.2 μm pore size PTFE filter to remove by-products. Pyridine is distilled off by using an evaporator to obtain a composition of the polycarbosilazane in xylene of 20 mass % concentration. The polycarbosilazane is a polyperhydrocarbosilazane from measurements of FT-IR, $^1$H-NMR, and $^{29}$Si-NMR. Mass average molecular weight is 1958 in terms of polystyrene measured by GPC. The ratio of (Intensity $CH_2$)/[(Intensity $CH_2$)+(Intensity NH)] in $^1$H-NMR spectrum is 0.065. The polyperhydrocarbosilazane is free of Si—Si bonds from $^{29}$Si-NMR measurement. A silicon-containing film is produced by the same process as Example 1.

Example 6

A silicon-containing film is produced from the polyperhydrocarbosilazane composition of Example 5 by the same process as Example 2.

Example 7

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. 5.6 g (0.019 mol) of 1,2-bis(trichlorosilyl)ethane is dissolved in 20 g of pyridine and the solution is introduced into the vessel. Then, 30 g (0.297 mol) of dichlorosilane was added to the mixture to produce a solid adduct ($SiH_2Cl_2.2C_5H_5N$). Upon confirming that the reaction mixture becomes −3° C. or less, 27 g of ammonia is slowly blown into the reaction mixture while stirring. Subsequently, stirring is continued for 12 hours, and then dry nitrogen is blown into the liquid layer for 30 minutes to remove excess ammonia. The resulting reaction product is subjected to filtration through 5.0 μm pore size PTFE filter and subsequently 0.2 μm pore size PTFE filter to remove by-products. Pyridine is distilled off by using an evaporator to obtain a composition of the polycarbosilazane in xylene of 20 mass % concentration. The polycarbosilazane is a polyperhydrocarbosilazane from measurements of FT-IR, $^1$H-NMR, and $^{29}$Si-NMR. Mass average molecular weight is 5670 in terms of polystyrene measured by GPC. The ratio of (Intensity $CH_2$)/[(Intensity $CH_2$)+(Intensity NH)] in $^1$H-NMR spectrum is 0.131. The polyperhydrocarbosilazane is free of Si—Si bonds from $^{29}$Si-NMR measurement. A silicon-containing film is produced by the same process as Example 1.

Example 8

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. 17.2 g (0.08 mol) of 1,2-bis(chlorodimethylsilyl)ethane is dissolved in 100 g of pyridine and the solution is introduced into the vessel. Then, 32 g (0.317 mol) of dichlorosilane was added to the mixture to produce a solid adduct ($SiH_2Cl_2.2C_5H_5N$). Upon confirming that the reaction mixture becomes −3° C. or less, 27 g of ammonia is slowly blown into the reaction mixture while stirring. Subsequently, stirring is continued for 12 hours, and then dry nitrogen is blown into the liquid layer for 30 minutes to remove excess ammonia. The resulting reaction product is subjected to filtration through 5.0 μm pore size PTFE filter and subsequently 0.2 μm pore size PTFE filter to remove by-products. Pyridine is distilled off by using an evaporator to obtain a composition of the polycarbosilazane in xylene of 20 mass % concentration. Mass average molecular weight is 2240 in terms of polystyrene measured by GPC. The ratio of (Intensity $CH_2$)/[(Intensity $CH_2$)+(Intensity NH)] in $^1$H-NMR spectrum is 0.344. The polycarbosilazane is free of Si—Si bonds from $^{29}$Si-NMR measurement. A silicon-containing film is produced by the same process as Example 1.

Comparative Example 1

A polyperhydrosilazane composition, which is a polymer composed of silicon, nitrogen and hydrogen and comprising a repeating unit of the formula (2), having a mass average molecular weight of 2850 was obtained according to the method described in JP H01-138108 A. A silicon-containing film is produced by the same process as Example 1.

Comparative Example 2

A silicon-containing film is produced from the polyperhydrosilazane composition of Comparative Example 1 by the same process as Example 2.

Comparative Example 3

The inside of a 1 L reaction vessel, equipped with a cooling condenser, a mechanical stirrer and a temperature controller, is replaced with dry nitrogen and thereafter 500 mL of dry pyridine is put into the reaction vessel, which is then cooled down to −3° C. 1.1 g (0.005 mol) of bis(dichlorosilyl)methane is introduced into the vessel. Then, 32 g (0.317 mol) of dichlorosilane was added to the mixture to produce a solid adduct ($SiH_2Cl_2.2C_5H_5N$). Upon confirming that the reaction mixture becomes −3° C. or less, 27 g of ammonia is slowly blown into the reaction mixture while stirring. Subsequently, stirring is continued for 12 hours, and then dry nitrogen is blown into the liquid layer for 30 minutes to remove excess ammonia. The resulting reaction product is subjected to filtration through 5.0 μm pore size PTFE filter and subsequently 0.2 μm pore size PTFE filter to remove by-products. Pyridine is distilled off by using an evaporator to obtain a composition of the polycarbosilazane in xylene of 20 mass % concentration. The polycarbosilazane is a polyperhydrocarbosilazane from measurements of FT-IR, $^1$H-NMR, and $^{29}$Si-NMR. Mass average molecular weight is 1848 in terms of polystyrene measured by GPC. The ratio of (Intensity $CH_2$)/[(Intensity $CH_2$)+(Intensity NH)] in $^1$H-NMR spectrum is 0.018. The polyperhydrocarbosilazane is free of Si—Si bonds from $^{29}$Si-NMR measurement. A silicon-containing film is produced by the same process as Example 1.

The results of Example 1-8 and Comparative Example 1-3 are shown in Table 1.

TABLE 1

| Examples | Mass average molecular weight | (Intensity CH2)/[(Intensity CH2) + (Intensity NH)] | Residual stress(tensile) (MPa) | Relative WER | Fbd (MV/cm) |
| --- | --- | --- | --- | --- | --- |
| Example 1 | 11450 | 0.426 | 55.7 | 0.42 | 7.48 |
| Example 2 | 11450 | 0.426 | 98.5 | 0.11 | 2.64 |
| Example 3 | 4190 | 0.276 | 78.4 | 0.60 | 6.55 |
| Example 4 | 4190 | 0.276 | 109.6 | 0.12 | 2.52 |
| Example 5 | 1958 | 0.065 | 136.8 | 1.66 | 5.51 |
| Example 6 | 1958 | 0.065 | 120.6 | 0.38 | 2.22 |
| Example 7 | 5670 | 0.131 | 112.3 | 0.58 | 5.23 |
| Example 8 | 2240 | 0.344 | 63.2 | 0.55 | 3.56 |
| Comparative Example 1 | 2850 | 0 | 177.5 | 4.58 | 4.09 |

TABLE 1-continued

| Examples | Mass average molecular weight | (Intensity CH2)/[(Intensity CH2) + (Intensity NH)] | Residual stress(tensile) (MPa) | Relative WER | Fbd (MV/cm) |
|---|---|---|---|---|---|
| Comparative Example 2 | 2850 | 0 | 935.6 | 5.98 | 0.98 |
| Comparative Example 3 | 1848 | 0.018 | 166.8 | 4.13 | 4.11 |

[Mass Average Molecular Weight]

Gel permeation chromatography (GPC) is measured using Alliance e2695 High Performance GPC system (Nihon Waters K.K.) and Super Multipore HZ-N GPC column (Tosoh Corporation). The measurement is performed using monodispersed polystyrene as a standard sample and tetrahydrofuran as an eluent, under the conditions of a flow rate of 0.6 ml/min and a column temperature of 40° C., and thereafter calculating the mass average molecular weight as a relative molecular weight to the standard sample.

[NMR Measurement]

The measurement of $^1$H-NMR is carried out on a sample solution which is obtained by dissolving 0.4 g of the polycarbosilazane in 1.6 g of a deuterochloroform. Tetramethylsilane (TMS) is added to the solution as internal standard for calibrating chemical shift. The sample solution is measured 80 times using a nuclear magnetic resonance apparatus, JNM-ECS400 (JEOL Ltd.) to obtain a $^1$H-NMR spectrum. An integrated intensity between 1.7 and 2.2 ppm ("Intensity CH$_2$") and an integrated intensity between 1.0 and 1.6 ppm ("Intensity NH") are measured. The Intensity CH$_2$ is divided by the sum of Intensity CH$_2$ and Intensity NH to obtain (Intensity CH$_2$)/[(Intensity CH$_2$)+(Intensity NH)].

The measurement of $^{29}$Si-NMR is carried out on a sample solution which is prepared by dissolving 0.4 g of the polycarbosilazane in 1.6 g of a deuterochloroform. Tetramethylsilane (TMS) is added to the solution as internal standard for calibrating chemical shift. The sample solution is measured 1,000 times using a nuclear magnetic resonance apparatus, JNM-ECS400 type (JEOL Ltd.) to obtain a $^{29}$Si-NMR spectrum.

[Residual Stress]

Residual stress of the silicon-containing film of 450 nm film thickness is measured using a thin film stress measurement system FLX-3300-T (Toho Technology Corp.).

[Relative Wet Etching Rate (WER)]

The silicon-containing film-coated 4-inch silicon wafer and a silicon thermal oxide film-coated silicon wafer as a reference are prepared. Film thickness of the films are measured with a spectroscopic ellipsometer (M-2000V JA Woollam Co., Inc.). The wafers are immersed at 20° C. for 3 minutes in an aqueous solution containing 1.0 wt % of hydrofluoric acid, then washed with pure water and dried. The film thickness of the films after the immersion are measured. The process is repeated. The wet etching rate is calculated by means of a linear approximation from the relation between an etching time and an amount of decrease in film thickness. The relative WER is calculated by the WER of the silicon-containing film divided by the WER of the silicon thermal oxide film.

[Electrical Breakdown Field (Fbd)]

Electrical breakdown field of the silicon-containing film of 200 nm film thickness is measured using SSM495 272A-M100 (Japan SSM K.K.). The electric field when the current density exceeds $1E^{-6}$ (A/cm$^2$) is taken as Fbd (MV/cm).

The invention claimed is:

1. A polycarbosilazane comprising a repeating unit represented by the following formula (1) and a repeating unit represented by the following formula (2):

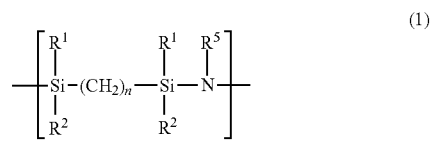

wherein, $R^1$, $R^2$, $R^3$ and $R^4$ are each independently a single bond, hydrogen or $C_{1-4}$ alkyl;

$R^5$ is independently a single bond or hydrogen;

and n is 1-2;

wherein a ratio of an integrated intensity between 1.7 and 2.2 ppm with respect to sum of an integrated intensity between 1.7 and 2.2 ppm and an integrated intensity between 1.0 and 1.6 ppm in $^1$H-NMR spectrum is 0.05 to 0.5;

wherein the polycarbosilazane is free of Si-Si bonds and wherein the mass average molecular weight is 1,500 to 25,000 measured by gel permeation chromatography in terms of polystyrene.

2. The polycarbosilazane according to claim 1, wherein the polycarbosilazane is a polyperhydrocarbosilazane.

3. A composition comprising the polycarbosilazane according to claim 1 and a solvent.

4. The composition according to claim 3, wherein the solvent is at least one selected from a group consisting of an aromatic compound, a saturated hydrocarbon compound, an unsaturated hydrocarbon compound, an ether compound, an ester compound, and a ketone compound.

5. The composition according to claim 3, wherein the composition comprises 1 to 50 mass % of the polycarbosilazane based on the total mass of the composition.

6. A method for producing a silicon-containing film comprises forming a coating above a substrate with the composition according to claim 3 and curing the coating.

7. The method for producing a silicon-containing film according to claim 6, wherein the curing is performed under a water vapor atmosphere.

8. The method for producing a silicon-containing film according to claim 6, wherein the curing is performed under a non-oxidizing atmosphere.

9. A silicon-containing film obtainable by the method according to claim 6.

10. A method for producing an electronic device, wherein the device comprising a silicon-containing film produced by the method according to claim 6.

11. A polycarbosilazane comprising a repeating unit represented by the following formula (1) and a repeating unit represented by the following formula (2):

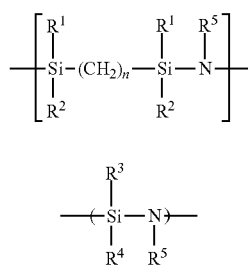

wherein,
R$^1$, R$^2$, R$^3$ and R$^4$ are each independently a single bond, hydrogen or C$_{1-4}$ alkyl;
R$^5$ is independently a single bond or hydrogen;
and n is 1-2;
wherein a ratio of an integrated intensity between 1.7 and 2.2 ppm with respect to sum of an integrated intensity between 1.7 and 2.2 ppm and an integrated intensity between 1.0 and 1.6 ppm in $^1$H-NMR spectrum is 0.05 to 0.5;
wherein the polycarbosilazane is polyperhydrocarbosilazane.

12. A composition comprising the polycarbosilazane according to claim 11 and a solvent.

13. The composition according to claim 12, wherein the solvent is at least one selected from a group consisting of an aromatic compound, a saturated hydrocarbon compound, an unsaturated hydrocarbon compound, an ether compound, an ester compound, and a ketone compound.

14. The composition according to claim 12, wherein the composition comprises 1 to 50 mass % of the polycarbosilazane based on the total mass of the composition.

* * * * *